United States Patent
Driskill-Smith et al.

(10) Patent No.: US 7,172,786 B2
(45) Date of Patent: Feb. 6, 2007

(54) METHODS FOR IMPROVING POSITIONING PERFORMANCE OF ELECTRON BEAM LITHOGRAPHY ON MAGNETIC WAFERS

(75) Inventors: Alexander Adrian Girling Driskill-Smith, Los Gatos, CA (US); Hieu Lam, Milpitas, CA (US); Kim Y. Lee, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 80 days.

(21) Appl. No.: 10/845,956

(22) Filed: May 14, 2004

(65) Prior Publication Data

US 2005/0252780 A1 Nov. 17, 2005

(51) Int. Cl.
*B05D 5/12* (2006.01)

(52) U.S. Cl. .............. 427/129; 427/127; 427/128; 427/131

(58) Field of Classification Search .......... 427/127, 427/128, 129, 131
See application file for complete search history.

(56) References Cited

U.S. PATENT DOCUMENTS

| | | | | |
|---|---|---|---|---|
| 4,551,905 A | * | 11/1985 | Chao et al. | 438/570 |
| 5,333,086 A | * | 7/1994 | Frey et al. | 360/126 |
| 6,541,182 B1 | | 4/2003 | Dogue et al. | |
| 6,656,538 B2 | | 12/2003 | Sato et al. | |
| 6,815,358 B2 | * | 11/2004 | Yang et al. | 438/700 |
| 2003/0102443 A1 | | 6/2003 | Kurokawa | |
| 2003/0137778 A1 | | 7/2003 | Kasahar et al. | |
| 2003/0182789 A1 | | 10/2003 | Kagotani et al. | |
| 2003/0228542 A1 | | 12/2003 | Minor et al. | |
| 2004/0090842 A1 | * | 5/2004 | Sharma et al. | 365/200 |
| 2005/0020047 A1 | * | 1/2005 | Mis et al. | 438/597 |

FOREIGN PATENT DOCUMENTS

| | | |
|---|---|---|
| JP | 2001-1023880 | 1/2001 |
| JP | 2001-1256613 | 9/2001 |
| JP | 2002-324312 | 11/2002 |

* cited by examiner

*Primary Examiner*—Alain L. Bashore
(74) *Attorney, Agent, or Firm*—D'Arcy H. Lorimer; Lorimer Labs

(57) ABSTRACT

The present invention discloses a method for the production of sub-micron structures on magnetic materials using electron beam lithography. A subtractive process is disclosed wherein a portion of a magnetic material layer is removed from the substrate using conventional lithography, and the remaining portion of the magnetic material layer is patterned by e-beam lithography. A additive process is also disclosed wherein a thin magnetic seed layer is deposited on the substrate, a portion of which is removed by conventional lithography and replaced with a non-magnetic conducting layer. The remaining portion of magnetic seed layer is patterned by e-beam lithography and the final magnetic structure produced by electroplating.

21 Claims, 4 Drawing Sheets

METHODS FOR IMPROVING POSITIONING PERFORMANCE OF ELECTRON BEAM LITHOGRAPHY ON MAGNETIC WAFERS

BACKGROUND OF THE INVENTION

The present invention is directed toward patterning magnetic materials and, more particularly, toward patterning magnetic materials with electron beam lithography.

As the areal densities of magnetic recording media continue to increase, the physical size of the sensors and writers designed to read and write data from and to the magnetic media must decrease. As areal densities approach 1000 Gigabytes/in$^2$, the critical dimensions of some magnetic features will be on the order of 25 nm. In order to manufacture and pattern critical dimensions on this small scale, lithography techniques capable of creating extremely fine patterns are required. One such technique is electron beam lithography, or E-beam lithography.

E-beam lithography utilizes a beam of electrons to "write", or pattern, features in an e-beam resist. The beam of electrons is emitted from a source, then demagnified, rastered, and directed toward the e-beam resist via magnetic lenses, thus depositing energy in the desired pattern in the resist film. A problem arises, however, when e-beam lithography is utilized to pattern magnetic materials. The magnetic fields from the magnetic materials being patterned can deflect the electrons from their intended path, or may affect the lenses themselves possibly resulting in distorted structures and patterns, and errors in pattern placement on the substrate. Position errors of an e-beam generated pattern may affect the overlay (the relative position or vertical alignment) of features present in underlying process layers, making the multilayer device non-functional when features drop below a critical dimension. Some future thin-film head designs, particularly for perpendicular recording, require very tight overlay between different process layers.

Recent findings have shown that electron beam placement distortion depends strongly on magnetic material coverage on the wafer. For full-film (100%) coverage of magnetic material, the error in beam placement can be greater than 1000 nm (|mean|+3 sigma), after removing first-order terms (global magnification and rotation). On wafers having partial (25%) coverage of magnetic material, the error improves at least ten-fold to less than 100 nm. On completely non-magnetic wafers, the error in beam placement depends only on the specifications of the electron-beam lithography machine itself, which can be better than 25 nm (|mean|+3 sigma). In addition to the coverage, it is expected that the thickness and moment of magnetic material on the wafer also affect beam placement and position accuracy performance.

What is needed is an improved electron beam lithography process for patterning magnetic materials.

SUMMARY OF THE INVENTION

It is an object of the present invention to provide a method for producing a sub-micron magnetic structure including depositing a magnetic seed layer on a substrate, producing a magnetic seed feature from the magnetic seed layer by removing a portion of the seed layer from the substrate, and depositing an e-beam resist layer on a top surface of the magnetic seed feature. A cavity is produced in the e-beam resist layer by e-beam lithography, the cavity extending from the top surface of the magnetic seed feature to the top surface of the e-beam resist layer, and a magnetic material is deposited in the cavity.

It is another object of the present invention to provide a method for producing a sub-micron magnetic structure including depositing a magnetic seed layer on a substrate, producing a magnetic seed feature from the magnetic seed layer by removing a portion of the seed layer from the substrate, and depositing an e-beam resist layer on a top surface of the magnetic seed feature. A cavity is produced in the e-beam resist layer by e-beam lithography, the cavity extending from the top surface of the magnetic seed feature to the top surface of the e-beam resist layer, and a magnetic material is deposited in the cavity by electroplating.

It is yet another object of the present invention to provide a method for producing a sub-micron magnetic structure including depositing a magnetic seed layer on a substrate, producing a magnetic seed feature from the magnetic seed layer by removing a portion of the seed layer from the substrate, depositing a conduction layer on the substrate, and depositing an e-beam resist layer on a top surface of the magnetic seed feature. The conduction layer makes electrical contact with at least a portion of the magnetic seed feature. A cavity is produced in the e-beam resist layer by e-beam lithography, the cavity extending from the top surface of the magnetic seed feature to the top surface of the e-beam resist layer, and a magnetic material is deposited in the cavity by electroplating.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1A:
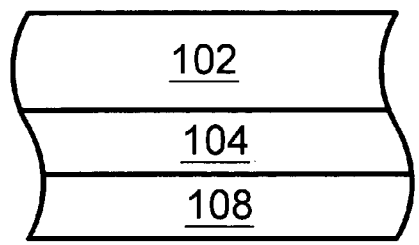
FIGS. 1a–h are partial cross sectional views of a magnetic material structure during a subtractive process for the production of sub-micron magnetic features according to an embodiment of the present invention.
Figure 1E:
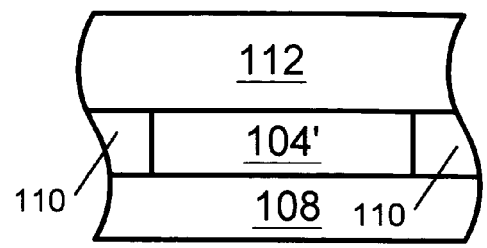
Figure 1B:
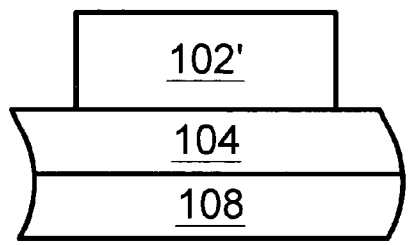
Figure 1F:
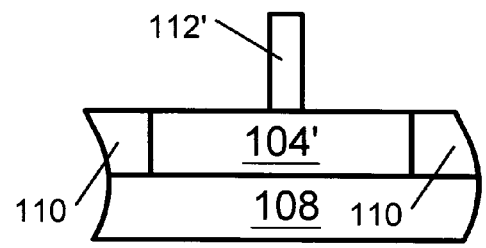
Figure 1C:
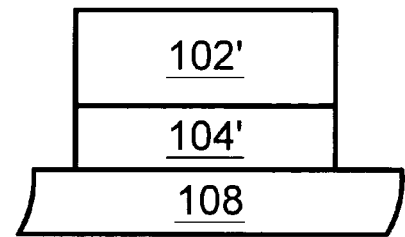
Figure 1G:
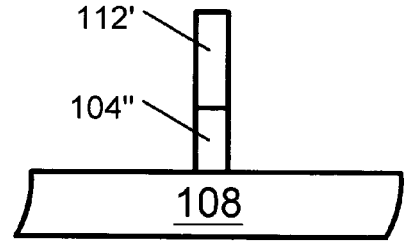
Figure 1D:
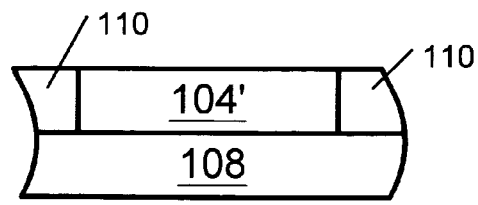
Figure 1H:
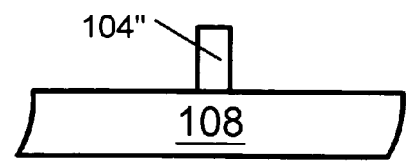

FIGS. 1a–h are partial cross sectional views of a magnetic material structure during a subtractive process for the production of sub-micron magnetic features according to an embodiment of the present invention. In FIG. 1a, a substrate material 108 is covered with a uniform layer of magnetic material 104. The substrate 108 can be a uniform material or be composed of a plurality of previously deposited materials and structures, including magnetic materials. Substrate 108 can be composed of metals, ceramics, or semiconductors, as is known to those skilled in the art. Magnetic material layer 104 can be composed of any suitable magnetic material, but is preferably composed of alloys of cobalt and iron, nickel and iron, or cobalt, nickel and iron. Deposited on the surface of the magnetic material layer 104 is a standard optical photo resist layer 102. In FIG. 1b, a non-critical optical lithography process is used to produce feature 102' in photo-resist layer 102. In FIG. 1c, feature 102' serves as a mask to create feature 104' in magnetic material layer 104. The majority of magnetic material layer 104 is removed by reactive ion etching (RIE), ion milling, or another suitable process. Following the removal of magnetic material layer 104, photo-resist feature 102' may be utilized to mask feature 104' during the optional deposition of a filler layer 110. Subsequent to the deposition of optional filler layer 110, photo-resist feature 102' is removed from the surface of magnetic feature 104' by methods well known to those skilled in the art, resulting in the structure shown in FIG. 1d. If optional filler layer 110 has been deposited, the top surfaces of feature 104' and filler layer 110 are approximately co-planar, which aids the critical lithography in subsequent steps. In FIG. 1e, an e-beam photo-resist layer 112 is deposited over magnetic material feature 104' and filler layer 110. Following an e-beam exposure of layer 112 and subsequent development of the e-beam resist, critical resist feature 112' is produced as is shown in FIG. 1f. Due to the reduced surface coverage of magnetic material 104, electron beam placement distortion is reduced, allowing accurate placement of critical resist feature 112' relative to underlying structures. Critical resist feature 112' acts as a mask during the etching of feature 104' and layers 110, resulting in the structure shown in FIG. 1g. Subsequent to removal of e-beam photo-resist feature 112', critical magnetic material feature 104" remains as is shown in FIG. 1h. It should be noted that the vertical dimension of feature 104" is determined by the original layer thickness of 104 as deposited in FIG. 1a.

Figure 2:
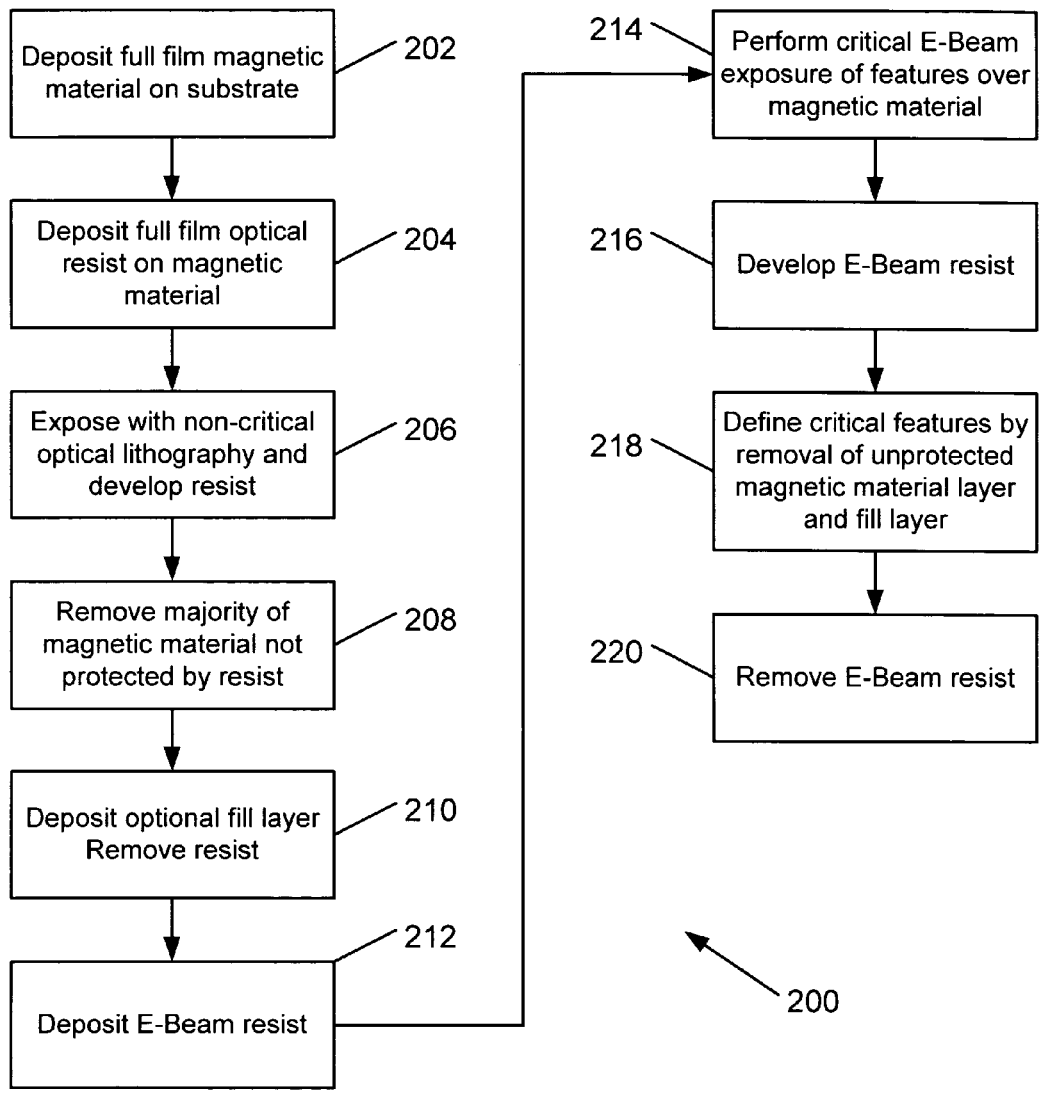
FIG. 2 is a block diagram of the process sequence shown in FIGS. 1a–h according to an embodiment of the present invention.

FIG. 2 is a block diagram of the process sequence 200 shown in FIGS. 1a–h according to an embodiment of the present invention. In step 202, a full film 104 of magnetic material is deposited on the substrate 108 surface. By "full film", it is meant that a uniform, blanket layer (or stack of multiple blanket layers) is deposited on substrate 108. In step 204, a full film of optical photo resist 102 is deposited over magnetic material layer 104. In step 206, a plurality of features 102' are produced on magnetic layer 104 by means of non-critical, standard optical lithography techniques. The features 102' are generally of a larger lateral dimension than is desired for the final sub-micron structure. Their placement over underlying structures is not critical, just as long as they cover the underlying structures adequately. In step 208, the magnetic material in layer 104 not protected by feature 102' is removed by an etching or milling process well known to those skilled in the art. This defines magnetic feature 104'. In step 210, fill layer 110 is optionally deposited on substrate 108 using feature 102' as a mask. Optional fill layer 110 is preferably a non-magnetic, dielectric material such as alumina. Following the deposition of optional fill layer 110, photo-resist feature 102' is removed. In step 212, an e-beam resist layer 112 is applied to the top surface of layer 110 and feature 104'. The e-beam resist may be composed of a different material than the photo resist 102, as it is optimized to respond to exposure from electron beams, as opposed to photons. In step 214, e-beam resist layer 112 is exposed to an electron beam defining the sub-micron critical dimension of the desired final magnetic structure. In step 216, the e-beam resist layer 112 is developed, leaving critical e-beam resist masking feature 112'. In step 218, an etching or ion milling process is used to remove all material in layers 110 and magnetic material feature 104' not protected by resist feature 112'. In step 220, the resist feature 112' is removed, leaving the desired critical magnetic material feature 104".

One of the problems with the aforementioned embodiments of the present invention is that magnetic interactions may still be present between the e-beam utilized during the exposure (in step 214, FIG. 2) and the plurality of magnetic features 104' remaining on the surface. This interaction will be a function of a number of variables, including the surface density of features, their proximity to each other, their moment, and the thickness of magnetic layer 104 from which the features 104' are fabricated. As the thickness and surface density increase, there will be an increased probability of position errors in the critical e-beam exposure step. There may even be significant errors generated if a group of features 104' are placed in close local proximity, even though the overall average surface density is low. Because of these factors, the subtractive process described in FIGS. 1 and 2 will be less suitable for high density structures, or structures requiring higher aspect ratios (layer thickness to width). To reduce the aforementioned problems, another embodiment of the present invention will be described that utilizes an additive process for the fabrication of the critical sub-micron magnetic features.

Figure 3A:
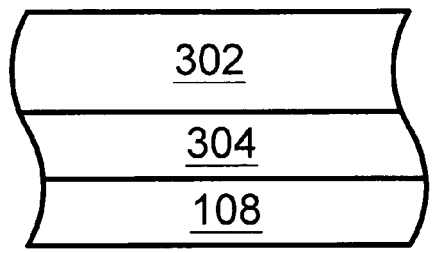
FIGS. 3a–h are partial cross sectional views of a magnetic material structure during an additive process for the production of sub-micron magnetic features according to an embodiment of the present invention; and, FIG. 4 is a block diagram of the process sequence shown in FIGS. 3a–h according to an embodiment of the present invention.
Figure 3B:
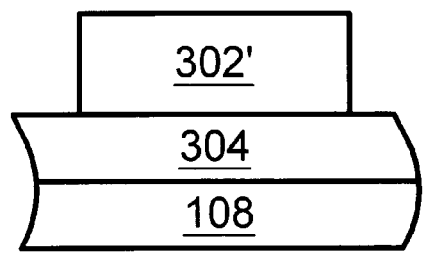
Figure 3C:
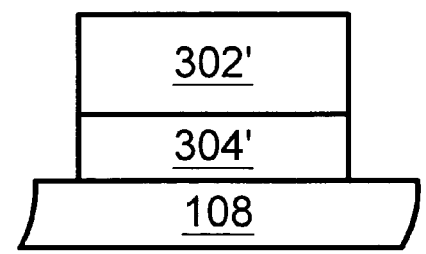
Figure 3D:
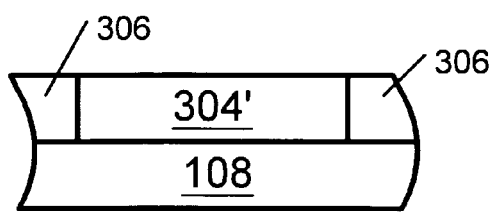

FIGS. 3a–h are partial cross sectional views of a magnetic material structure during an additive process for the production of sub-micron magnetic features according to an embodiment of the present invention. In FIG. 3a, a substrate material 108 is covered with a uniform layer of magnetic seed layer 304. This seed layer 304 is considerably thinner than layer 104 in FIG. 1, because it does not have to be deposited to a thickness required by the dimension of the completed critical feature 104". Magnetic seed layer 304 may be deposited as thin as practical, without creating voids, pinholes, or discontinuities in the layer. Preferably, the seed layer 304 thickness is between 50 and 300 nanometers. More preferably, the seed layer thickness is between 80 and 160 nanometers. The thickness of the magnetic seed layer 304 considerably reduces electron beam interactions during subsequent e-beam patterning steps when compared to the full thickness magnetic film 104 (which may be many microns thick). The substrate 108 can be a uniform material or be composed of a plurality of previously deposited materials and structures, including magnetic materials. Substrate 108 can be composed of metals, ceramics, or semiconductors, as is known to those skilled in the art. Magnetic seed layer 304 can be composed of any suitable magnetic material, but is preferably composed of alloys of cobalt and iron, nickel and iron, or cobalt, nickel and iron. For example, a nickel/iron alloy may comprise from 10 to 90 atomic % nickel and 90 to 10 atomic % iron. Deposited on the surface of the magnetic seed layer 304 is a standard optical photo resist layer 302. In FIG. 3b, a non-critical optical lithography process is used to produce feature 302' in photo-resist layer 302. In FIG. 3c, feature 302' serves as a mask to create feature 304' in magnetic seed layer 304. The majority of magnetic seed layer 304 is removed by reactive ion etching (RIE), ion milling, or another suitable process. Following the removal of magnetic seed layer 304, photo-resist feature 302' is utilized to mask seed layer feature 304' during the deposition of a conduction layer 306. Conduction layer 306 makes electrical contact with at least a portion of magnetic seed layer feature 304'. Conduction layer 306 is composed of any non-magnetic, conductive material compatible with subsequent process steps and substrate 108. Preferably, conduction layer 306 is composed of Rh, Ta, or their alloys. Other conductive materials such as doped poly-silicon, other noble or refractory metals, and their alloys, may be used. It may be desirable to match the lateral conductivity of the conduction layer 306 to that of the magnetic seed layer 304.

Figure 3E:
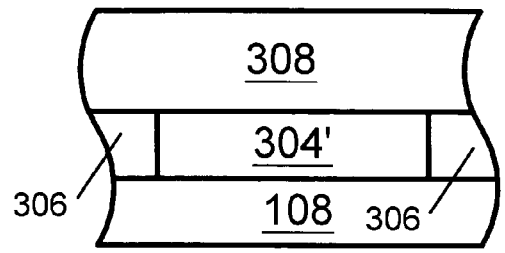
Figure 3F:
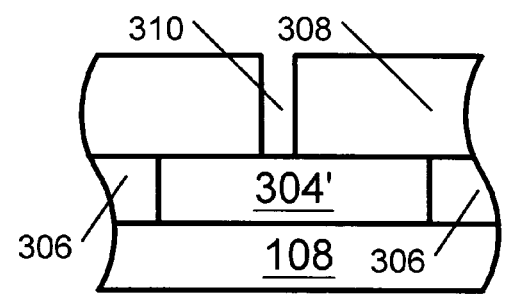
Figure 3G:
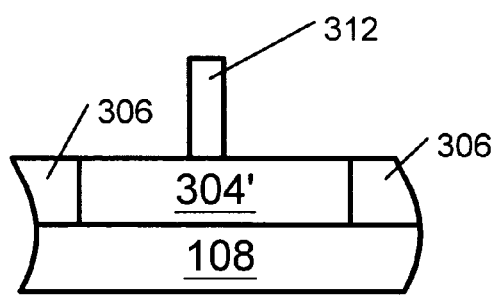
Figure 3H:
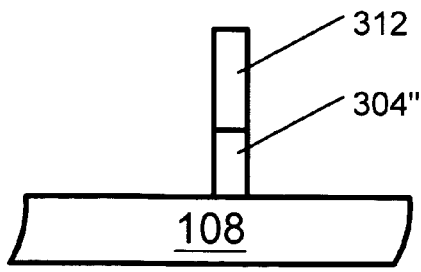

Conduction layer 306 may be deposited by any convenient technique, including (but not limited to) CVD (chemical vapor deposition), PVD (physical vapor deposition), sputtering, or electroless plating. Subsequent to the deposition of conduction layer 306, photo-resist feature 302' is removed from the surface of magnetic seed layer feature 304' by methods well known to those skilled in the art, resulting in the structure shown in FIG. 3d. In FIG. 3e, an e-beam photo-resist layer 308 is deposited over magnetic seed layer feature 304' and conductive layer 306. In FIG. 3f, resist layer 308 is exposed to the critical e-beam patterning, producing a sub-micron cavity 310 in e-beam resist layer 308 following development of the resist. Cavity 310 will be used in subsequent steps to fabricate the critical magnetic features. The position accuracy of cavity 310 (and therefore the resulting critical features) is significantly improved over the previously described embodiment and the prior art. This is due to reduced magnetic interactions of surface structures 304' with the patterning e-beam as a result of a thinner magnetic layer 304 coupled with reduced total surface coverage. After the formation of cavity 310, a magnetic alloy (alone or in combination with other non-magnetic metal layers) is deposited in cavity 310 by electroplating. Electrical current is conducted within conduction layer 306 to magnetic structure 304' and the metals being deposited within cavity 310. Following deposition within cavity 310, and subsequent stripping of e-beam resist layer 308, the structure of FIG. 3g is produced. Critical magnetic feature 312 is now defined. Optionally, the seed layers 306 and 304' (not protected by feature 312) can be removed, as is shown in FIG. 3h.

One advantage of the present embodiment is that the aspect ratio of critical feature 312 (that is, its height above the surface to its width) may be potentially greater than structures produced with the subtractive method. The maximum height of structure 312 is determined by the thickness of the e-beam resist, whereas the height of structure 104" is determined by the thickness of the original full film layer 104. If layer 104 is deposited too thick, film stress problems may develop. Also, depositing a thicker full film layer 104 will increase deposition and etching process times, as well as risk undercutting of the critical structure 104" during the etch process. A further side-effect of the etch process may be a reduction in the lateral dimension of feature 112' and therefore also of critical structure 104". This would be undesirable if it results in a degradation in the uniformity across substrate 108 of the lateral dimension of structures 104". In the present embodiment, there is no intermediate etch process, and the lateral dimension of critical feature 312 is determined directly by the formation of cavity 310 with e-beam lithography and subsequent electroplating. Additional process control of the critical feature is provided in the present embodiment in that its height may be determined by the electroplating process, to produce critical features that are "shorter" that the e-beam resist thickness, if desired. This potentially could produce critical features of varying heights at different locations of the substrate, which is not possible with a full film subtractive process.

Figure 4:
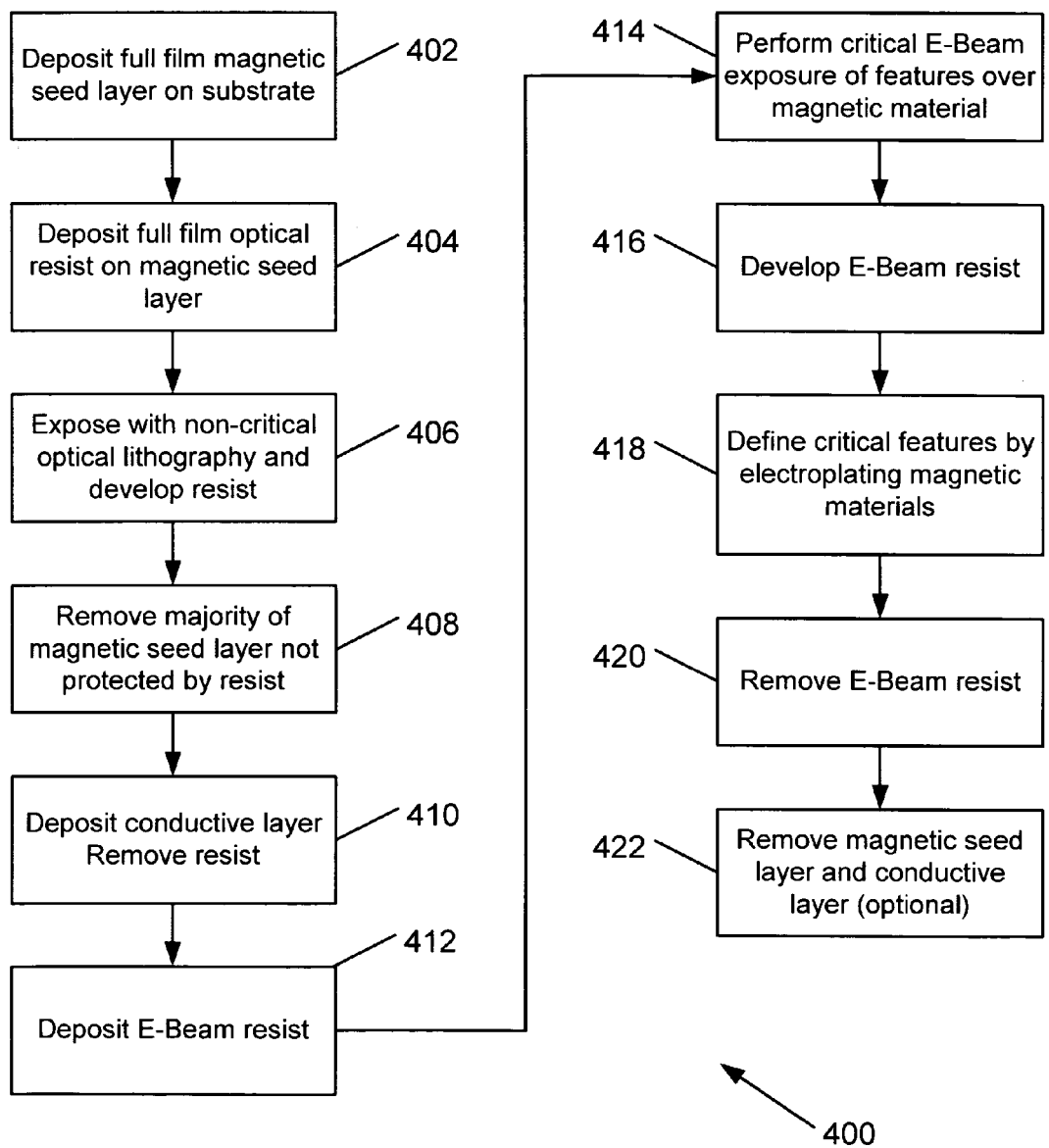

FIG. 4 is a block diagram 400 of the process sequence shown in FIGS. 3a–h according to an embodiment of the present invention. In step 402, a full film magnetic seed layer 304 is deposited on substrate 108. In step 404, a full film standard photo resist layer 302 is deposited on the surface of seed layer 304. In step 406, a plurality of features 302' are produced on magnetic seed layer 304 by means of non-critical, standard optical lithography techniques. The features 302' are generally of a larger dimension than is desired for the final sub-micron structure 312. The placement of features 302' over underlying structures is not critical, just as long as they cover the underlying structures adequately. In step 408, the magnetic material in seed layer 304 not protected by feature 302' is removed by an etching or milling process well known to those skilled in the art. This defines magnetic feature 304'. In step 410, conductive layer 306 is deposited on substrate 108 using feature 302' as a mask. In step 412, an e-beam resist layer 308 is deposited on the surface of layer 306 and features 304'. In step 414, the e-beam exposure of resist layer 308 is performed, defining the location and dimension of the critical magnetic features. In step 416 the resist is developed, creating cavity 310 in resist layer 308. In step 418, critical magnetic feature 312 is produced by depositing a magnetic alloy in cavity 310 by electroplating. In step 420 the resist layer 308 is removed, and in optional step 422, the remaining seed layer and conduction layer may be removed.

The present invention is not limited by the previous embodiments heretofore described. Rather, the scope of the present invention is to be defined by these descriptions taken together with the attached claims and their equivalents.

What is claimed is:

1. A method for producing a sub-micron magnetic structure further comprising:
   depositing a magnetic seed layer on a substrate;
   producing a magnetic seed feature from said magnetic seed layer by removing a portion of said magnetic seed layer from said substrate;
   depositing a conduction layer on said substrate, said conduction layer making electrical contact with at least a portion of said magnetic seed feature;
   depositing an e-beam resist layer on a top surface of said magnetic seed feature;
   producing a cavity in said e-beam resist layer by e-beam lithography, said cavity extending from said top surface of said magnetic seed feature to a top surface of said e-beam resist layer; and,
   depositing a magnetic material in said cavity.

2. A method for producing a sub-micron magnetic structure as recited in claim 1, wherein said magnetic material is deposited in said cavity by electroplating.

3. A method for producing a sub-micron magnetic structure as recited in claim 1, wherein said magnetic seed layer is between 50 nanometers and 300 nanometers thick.

4. A method for producing a sub-micron magnetic structure as recited in claim 1, wherein said magnetic seed layer is between 80 nanometers and 160 nanometers thick.

5. A method for producing a sub-micron magnetic structure as recited in claim 1, wherein said magnetic comprises alloys of nickel and iron.

6. A method for producing a sub-micron magnetic structure as recited in claim 1, wherein said magnetic material comprises alloys of nickel, iron, and cobalt.

7. A method for producing a sub-micron magnetic structure as recited in claim 1, wherein said magnetic seed layer comprises alloys of nickel and iron.

8. A method for producing a sub-micron magnetic structure as recited in claim 1, wherein said magnetic seed layer comprises alloys of nickel, iron, and cobalt.

9. A method for producing a sub-micron magnetic structure as recited in claim 1, wherein said magnetic seed feature is produced by optical lithography.

10. A method for producing a sub-micron magnetic structure as recited in claim 1, wherein said conduction layer comprises tantalum.

11. A method for producing a sub-micron magnetic structure as recited in claim 1, wherein said conduction layer comprises rhodium.

12. A method for producing a sub-micron magnetic structure, comprising:
   depositing a magnetic seed layer on a substrate;
   producing a magnetic seed feature from said magnetic seed layer by removing a portion of said magnetic seed layer from said substrate;
   depositing a conduction layer on said substrate, said conduction layer making electrical contact with at least a portion of said magnetic seed feature;
   depositing an e-beam resist layer on a top surface of said magnetic seed feature;
   producing a cavity in said e-beam resist layer by e-beam lithography, said cavity extending from said top surface of said magnetic seed feature to a top surface of said e-beam resist layer; and,
   depositing a magnetic material in said cavity by electroplating.

13. A method for producing a sub-micron magnetic structure as recited in claim 12, wherein said magnetic seed layer is between 50 nanometers and 300 nanometers thick.

14. A method for producing a sub-micron magnetic structure as recited in claim 12, wherein said magnetic seed layer is between 80 nanometers and 160 nanometers thick.

15. A method for producing a sub-micron magnetic structure as recited in claim 12, wherein said magnetic material comprises alloys of nickel and iron.

16. A method for producing a sub-micron magnetic structure as recited in claim 12, wherein said magnetic material comprises alloys of nickel, iron, and cobalt.

17. A method for producing a sub-micron magnetic structure as recited in claim 12, wherein said magnetic seed layer comprises alloys of nickel and iron.

18. A method for producing a sub-micron magnetic structure as recited in claim 12, wherein said magnetic seed layer comprises alloys of nickel, iron, and cobalt.

19. A method for producing a sub-micron magnetic structure as recited in claim 12, wherein said magnetic seed feature is produced by optical lithography.

20. A method for producing a sub-micron magnetic structure as recited in claim 12, wherein said conduction layer comprises tantalum.

21. A method for producing a sub-micron magnetic structure as recited in claim 12, wherein said conduction layer comprises rhodium.

* * * * *

UNITED STATES PATENT AND TRADEMARK OFFICE
CERTIFICATE OF CORRECTION

| | | |
|---|---|---|
| PATENT NO. | : 7,172,786 B2 | Page 1 of 1 |
| APPLICATION NO. | : 10/845956 | |
| DATED | : February 6, 2007 | |
| INVENTOR(S) | : Driskill-Smith et al. | |

It is certified that error appears in the above-identified patent and that said Letters Patent is hereby corrected as shown below:

Col. 6
In claim 1, line 25, the word "further" should be omitted from the preamble.

The preamble should read:

1. A method for producing a sub-micron magnetic structure comprising:

In claim 5, line 51, the word --material-- should be added. Claim 5 should read:

5. A method for producing a sub-micron magnetic structure as recited in claim 1, wherein said magnetic material comprises alloys of nickel and iron.

Signed and Sealed this

Twenty-ninth Day of April, 2008

JON W. DUDAS
*Director of the United States Patent and Trademark Office*